United States Patent [19]
Patel et al.

[11] 3,974,437

[45] Aug. 10, 1976

[54] SWITCHING CIRCUIT FOR STATIC INVERTER

[75] Inventors: Bahechar S. Patel, Kettering; Thomas W. Moore, Dayton, both of Ohio

[73] Assignee: AMF Incorporated, White Plains, N.Y.

[22] Filed: July 25, 1975

[21] Appl. No.: 598,943

[52] U.S. Cl. .............................. 321/27 R; 321/45 R
[51] Int. Cl.² .......................................... H02M 7/00
[58] Field of Search ........... 321/27 R, 27 MS, 45 R; 331/52, 55, 56

[56] References Cited
UNITED STATES PATENTS

| | | |
|---|---|---|
| 3,027,508 | 3/1962 | Johnson ................................ 321/19 |
| 3,225,209 | 12/1965 | Schuster ......................... 321/45 R X |
| 3,297,928 | 1/1967 | Delden ......................... 331/113 A X |
| 3,309,600 | 3/1967 | Wellford ........................ 321/27 MS |
| 3,345,580 | 10/1967 | Tracy ............................ 331/113 A X |
| 3,416,062 | 12/1968 | Bernhard et al. .............. 321/27 MS |
| 3,458,797 | 7/1969 | Larsen .......................... 321/27 MS |
| 3,601,680 | 8/1971 | Beckwith .............................. 321/2 |

Primary Examiner—William M. Shoop
Attorney, Agent, or Firm—George W. Price; John H. Gallagher

[57] ABSTRACT

A switching circuit for a static inverter employing a plurality of parallel switching stages for switching a d.c. voltage to produce an a.c. output. Novel driver circuit for all switching stages of a group also serves as switching means for first switching stage of the group.

10 Claims, 1 Drawing Figure

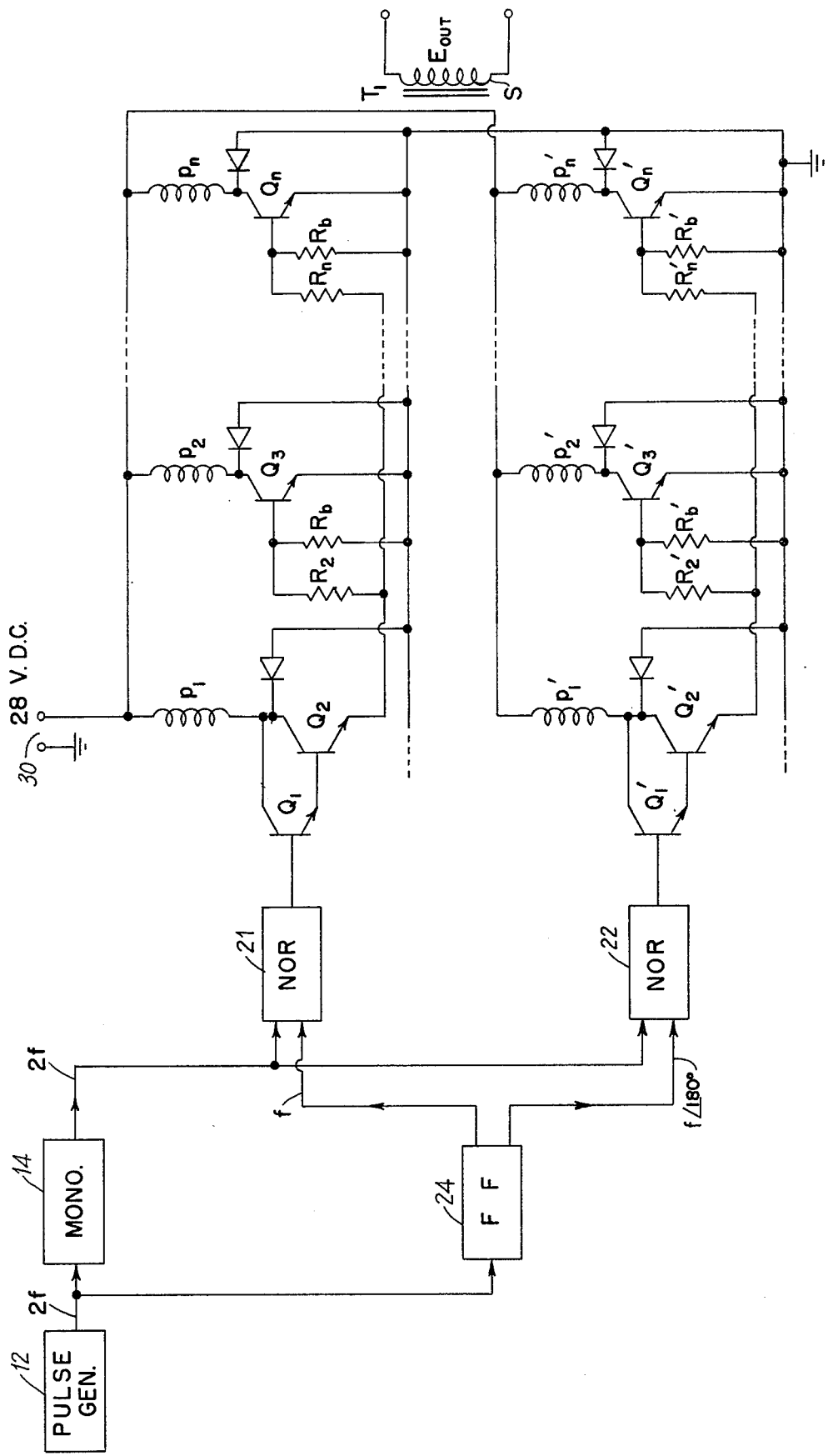

SWITCHING CIRCUIT FOR STATIC INVERTER

This invention relates to a static inverter and more particularly to a novel switching circuit for switching a d.c. voltage to produce an a.c. output voltage.

In a preferred embodiment of the present invention the power switches of the static inverter are a plurality of three electrode transistor devices connected in parallel. Each transistor has a primary winding of an output transformer connected in its collector circuit. The switching transistors are arranged in two groups and the two groups are alternately rendered conductive so as to alternately excite the respective primary windings. The primary windings of the two groups are wound push pull on the output transformer and thus produce an a.c. voltage in the secondary winding of the transformer.

The present invention resides in a novel means for driving each group of switching transistors and involves the use of a pair of compound connected transistors connected in the Darlington configuration. These transistors function as the driver for all switching transistors in the group and also serve as the switching means of the first switching stage of the group. In the first switching stage that utilizes the dual purpose Darlington pair, the primary winding associated therewith has a fewer number of turns, such as one less turn, than the remainder of the windings in the group.

The novel arrangement of this circuit allows the driver for the power switching transistors to operate in such a manner as to provide the required drive energy without contributing excessively to the voltage drop across the switching transistors, while simultaneously contributing to the useful output power.

The invention will be described by referring to the accompanying drawing which is a simplified illustration of a static inverter showing in schematic form the novel switching circuit of the present invention.

In the accompanying drawing, two groups of parallel connected switching transistors $Q_1, Q_2, Q_3 \ldots Q_n$ and $Q_4', Q_2', Q_3' \ldots Q_n'$, respectively, operate alternately to switch d.c. current through the two groups of primary windings $p_1, p_2 \ldots p_n$ and $p_1', p_2' \ldots p_n'$ to excite the secondary winding S of transformer $T_1$ in push pull, thereby producing an a.c. output voltage E out. The number of switching stages in the two groups will be the same, and the particular number $n$ will be a function of the power requirements of the inverter.

Each group of switching stages operates in response to a series of control pulses coupled to the base electrode of the respective transistors $Q_1$ and $Q_1'$. The manner of producing the two series of control pulses, which occur alternately at the base electrodes of transistors $Q_1$ and $Q_1'$, is not the subject of this invention and any of a number of known systems may be employed. For purpose of discussion, the basic features of one known type of control pulse generating system is illustrated in simplified form in the accompanying drawing.

A pulse generator 12 produces a series of regularly occurring triggering pulses at a rate $2f$ which is twice the frequency of the desired output signal E out. The triggering pulses are coupled to monostable circuit 14 which produces a corresponding series of pulses at the rate $2f$. The output pulses from monostable circuit 14 are coupled as one input signal to each of the NOR gates 21 and 22. Pulses from monostable circuit 14 have durations, or duty cycles, which will establish the "on" times, or duty cycles, of the switching transistors $Q_1, Q_2, Q_3 \ldots Q_n$ and $Q_1', Q_2', Q_3' \ldots Q_n'$.

The triggering pulses from pulse generator 12 also are coupled to flip flop circuit 24 which operates to produce two output signals. The output signals of flip flop 24 both are at the frequency $f$ and the two signals are 180° out of phase. The output signals of flip flop 24 are respectively coupled as the second inputs of NOR gates 21 and 22.

With the described input signals to the two NOR gates, they operate alternately to produce output control pulses having durations corresponding to the durations of the output pulses from monostable circuit 14.

As is well known, current and voltage regulation and various other features may be provided in the circuitry for producing the respective series of alternately occurring control pulses. However, because this portion of the inverter circuit is not the subject of this invention further discussion is believed unnecessary.

Because the two groups of switching stages are identical in construction and operation, only the top group comprised of transistors $Q_1 \ldots Q_n$ and windings $p_1 \ldots p_n$ will be described.

The compound connected transistors $Q_1$ and $Q_2$ are of like conductivity type and are connected in the well known Darlington configuration. Transistors manufactured in this configuration are commonly available in a single package. As described in U.S. Pat. No. 2,663,806 — Darlington, this configuration is characterized by a large current multiplication factor. For this reason the Darlington configuration commonly is used as a driver stage, as it is in this switching circuit.

A positive control pulse coupled to the base electrode of transistor $Q_1$ causes both transistors $Q_1$ and $Q_2$ to conduct current from the 28 volt d.c. supply source 30 through primary winding $p_1$. The output current from the emitter electrode of $Q_2$ is coupled through the parallel connected resistors $R_2 \ldots R_n$ to the base electrodes of transistors $Q_3 \ldots Q_n$ to provide base drive current for all of those transistors. Consequently, transistors $Q_3 \ldots Q_n$ also will conduct and will pass current from the d.c. supply source 30 through their respective primary windings $p_2 \ldots p_n$ to ground. (It may be recognized that the configuration of transistors $Q_1$, $Q_2$ and each of the switching transistors $Q_3 \ldots Q_n$ constitute three element Darlington configurations.) Resistors Rb are base-emitter bias resistors for the transistors $Q_3 \ldots Q_n$. The diodes between the collectors of the transistors and ground provide reverse current protection.

It is seen that the first primary winding $p_1$ is connected between the d.c. supply source 30 and the collectors of the Darlington pair of transistors $Q_1$ and $Q_2$. Therefore, the current flow in the driver stage, $Q_1$ and $Q_2$, also energizes the primary winding $p_1$ to produce useful output.

The arrangement of the Darlington pair driver transistors $Q_1$ and $Q_2$ with respect to the switching transistors $Q_3 \ldots Q_n$ creates an extra voltage drop at the collectors of the switching transistors which could result in the switching transistors exceeding their power ratings during saturation current flow therethrough.

This situation may be seen by the following example. The driver circuit comprised of transistors $Q_1$ and $Q_2$ is connected from the 28 volt d.c. supply source 30 to ground through the base-emitter circuits of the parallel connected switching transistors $Q_3 \ldots Q_n$. Considering only the first two switching stages in this example, and for the present in order to develop a concept of this invention, it will be assumed that primary windings $p_1$ and $p_2$ both have the same number of turns (11 turns). With this assumption the voltage drops across the two switching stages may be expressed as follows.

$$V_{p1}+V_{ce}(Q_1)+V_{be}(Q_2)+V_{R2}+V_{be}(Q_3) = V_{p2}+V_{ce}(Q_3)$$
$$= 28v \qquad (1)$$

wherein the terms in the above equation are as follows. (The numerical values in the following listing are representative values in a circuit having the circuit components and parameters set forth at the conclusion of this description.)

$V_{p1}$, $V_{p2}$ = voltage drops across windings $p_1$ and $p_2$
$V_{ce}(Q_1) = 0.5v$ = collector–emitter drop transistor $Q_1$
$V_{be}(Q_2) = 1.3v$ = base-emitter drop transistor $Q_2$
$V_{R2} = 0.40v$ = drop across resistor $R_2$
$V_{be}(Q_3) = 1.65v$ = base-emitter drop transistor $Q_3$
$V_{ce}(Q_3)$ = collector-emitter drop transistor $Q_3$ Substituting the numerical values into equation (1) gives the following.

$$V_{p1}+0.5+1.3+0.40+1.65 = V_{p2}+V_{ce}(Q_3) = 28v \qquad (2)$$

$$V_{p1}+3.85 = V_{p2}+V_{ce}(Q_3) = 28v \qquad (3)$$

Because primary windings $p_1$ and $p_2$ are here assumed to have the same number of turns, $V_{p1}$ and $V_{p2}$ in the above equations are equal and it is seen from equation (3) that $V_{ce}(Q_3) = 3.85$ volts. Also from the above equation it is seen that $$V_{p1} = V_{p2} = 28v - 3.85v = 24.15 \text{ volts} \qquad (4)$$

With an assumed saturation current flowing through transistor $Q_3$ of the order of 20 amps, the maximum power required to be dissipated by that transistor could be as high as 77 watts (20 amps × 3.85 volts). This exceeds the power ratings of many available transistors that may be used as the switching transistors, particularly when used at elevated case temperatures, and for large conduction angles.

In accordance with this invention, the voltage across switching transistor $Q_3$ is reduced to an acceptable magnitude by creating a voltage differential between $V_{p1}$ and $V_{p2}$ (and the voltages on all remaining primary windings ... pn), with the voltage $V_{p2}$ being made higher than $V_{p1}$. This is accomplished by providing more turns on each of the windings $p_2$ ... pn than are on winding $p_1$. In one embodiment of a circuit constructed as illustrated, winding $p_1$ had 11 turns and the remainder of the windings $p_2$ ... pn each had 12 turns. A numerical example will explain the result obtained.

From equation (4) it is seen that the voltage across the eleven turn winding was 24.15 volts. The voltage on each turn therefore is $$24.15/11 = 2.195 \text{ volts/turn} \qquad (5)$$

Now with twelve turns on each of the windings $p_2$ ... pn, the voltage across winding p2 will be $$V_{p2} = 2.195 \times 12 = 26.34 \text{ volts} \qquad (6)$$

The voltage across switching transistor $Q_3$ now is $$V_{ce}(Q_3) = 28v - V_{p2} = 28 - 26.34 = 1.66 \text{ volts} \qquad (7)$$

With a saturation current in the range of 20 amps through the switching transistors the maximum power required to be dissipated will be in the range of 33.2 watts. This is a practical power requirement for presently available power transistors.

As seen above, a further consequence of the present invention is that with a lesser voltage drop across the switching transistors, the voltages across primary winding $p_2$ ... pn are increased, thus producing higher useful output voltages from the remainder of the primary windings $p_2$ ... pn.

Representative circuit components and parameter values for a circuit constructed and operated as described and as represented in the accompanying drawing are as follows.

transistors $Q_1$ and $Q_2$ — 2N6284 (Darlington)
transistors $Q_3$ ... Qn — 2N6328
winding $p_1 = 11$ turns
windings $p_2$ ... pn = 12 turns
$R_2 - 0.15$ ohm
$R_b - 51$ ohms
supply voltage — 28 volts d.c.

Although the driver stage has been illustrated as a two element Darlington configuration ($Q_1$ and $Q_2$), three or more elements may be employed in the same type of configuration. In such an embodiment the voltage drop across the switching transistors $Q_3$ ... Qn would be greater so that a corresponding voltage reduction would have to be provided on the primary winding $p_1$.

Also it should be understood that the switching stages could be connected in emitter follower configurations if so desired.

While a preferred embodiment of the invention has been illustrated and described, it is to be understood that alterations and modifications may be made to the described embodiment without departing from the scope of the present invention.

What is claimed is:

1. A switching circuit for use in a static inverter for switching a d.c. voltage source to produce an a.c. output voltage, comprising
   at least one switching transistor connected across said d.c. voltage source, said transistor having a control electrode and first and second electrodes,
   a first transformer primary winding series connected with said switching transistor across said source,
   a plurality of like conductivity type transistors compound connected in a Darlington configuration to provide a control terminal, a collector terminal, and an emitter terminal,
   means for connecting the emitter terminal of the compound connected transistors to the control electrode of said switching transistor,
   a second transformer primary winding series connected with said Darlington configuration, and
   means for coupling input signals to the control terminal of said compound connected transistors.

2. The combination claimed in claim 1 wherein said second primary winding produces a lower voltage thereacross than the voltage across the first primary winding.

3. The combination claimed in claim 2 wherein the second primary winding has fewer turns than the first primary winding.

4. A switching circuit for use in a static inverter, comprising a plurality of like conductivity type transistors compound connected in Darlington configuration to provide a control terminal and second and third terminals, a first transformer primary winding connected to a conductor of a d.c. source of supply and one of said second and third terminals, a switching transistor having a control electrode and second and third electrodes, a second transformer primary winding series connected to one of the second and third electrodes, said switching transistor and second primary winding being connected across said source, means for connecting the other one of the second and third terminals of the Darlington configuration to the control electrode of the switching transistor, and means for coupling control signals to the control terminal of the Darlington configuration.

5. The combination claimed in claim 4 wherein said first primary winding provides a lower voltage thereacross than the voltage across the second primary winding.

6. The combination claimed in claim 5 wherein the first primary winding has fewer turns than the second primary winding.

7. A switching circuit for use in a static inverter for switching a d.c. voltage source to produce an a.c. output voltage, comprising at least one switching transistor connected across said d.c. voltage source, said transistor having control, collector and emitter electrodes, a first transformer primary winding series connected between the collector electrode of the switching transistor and said source, a plurality of transistors compound connected in a Darlington configuration to provide a control terminal, a collector terminal, and an emitter terminal, means for connecting the emitter terminal of the compound connected transistors to the control electrode of said switching transistor, a second transformer primary winding connected between said source and the collector terminal of the compound connected transistors, means for applying control pulses to the control terminal of said compound connected transistors, the second primary winding being constructed and arranged to provide a lesser voltage thereacross than the voltage produced across the first primary winding.

8. The combination claimed in claim 7 wherein the second primary winding has fewer turns than said first primary winding.

9. A combination driver stage and output switching stage for use in a static inverter, comprising a plurality of like conductivity type transistors compound connected with their collector electrodes connected together and with the emitter electrode of each transistor but the last one connected to the base electrode of the next succeeding one in the compound connected configuration, thereby providing a control terminal at the base electrode of the first transistor of the configuration, a common collector terminal and an emitter terminal at the emitter electrode of the last transistor of the configuration, a first transformer primary winding having one terminal connected to said collector terminal of the compound connected configuration, the opposite terminal of the primary winding connected to a d.c. source of supply, a plurality of switching transistors connected across said source, each of said switching transistors having a control electrode and second and third electrodes, a plurality of transformer windings each connected between said source and the second electrode of a respective one of said switching transistors, means for connecting the emitter terminal of said compound connected configuration to the control electrode of each one of said switching transistors, said first primary winding being constructed and arranged to produce a lower voltage thereacross than is produced across any of said plurality of primary windings, and means for coupling input signals to the control terminal of said compound connected configuration.

10. The combination claimed in claim 9 wherein said first primary winding has fewer total turns than any of said plurality of primary windings.

* * * * *